United States Patent
Brabec et al.

(10) Patent No.: US 12,323,446 B2
(45) Date of Patent: Jun. 3, 2025

(54) MULTI-MODAL MODELS FOR DETECTING MALICIOUS EMAILS

(71) Applicant: Cisco Technology, Inc., San Jose, CA (US)

(72) Inventors: Jan Brabec, Prague (CZ); Radek Starosta, Prague (CZ)

(73) Assignee: Cisco Technology, Inc., San Jose, CA (US)

(*) Notice: Subject to any disclaimer, the term of this patent is extended or adjusted under 35 U.S.C. 154(b) by 261 days.

(21) Appl. No.: 18/127,501

(22) Filed: Mar. 28, 2023

(65) Prior Publication Data

US 2024/0333733 A1 Oct. 3, 2024

(51) Int. Cl.
  *H04L 9/40* (2022.01)
  *G06V 10/82* (2022.01)

(52) U.S. Cl.
  CPC .......... *H04L 63/1425* (2013.01); *G06V 10/82* (2022.01); *H04L 63/1416* (2013.01); *H04L 63/1441* (2013.01)

(58) Field of Classification Search
  CPC ............. H04L 63/1425; H04L 63/1416; H04L 63/1441; H04L 63/1483; G06V 10/82
  See application file for complete search history.

(56) References Cited

U.S. PATENT DOCUMENTS

| | | | |
|---|---|---|---|
| 10,601,865 B1 | 3/2020 | Mesdaq et al. | |
| 10,834,128 B1 | 11/2020 | Rajagopalan et al. | |
| 2020/0311467 A1 | 10/2020 | Srivastava et al. | |
| 2020/0396190 A1* | 12/2020 | Pickman | H04L 67/306 |
| 2022/0094713 A1 | 3/2022 | Lee et al. | |
| 2022/0210188 A1* | 6/2022 | Grewal | H04L 63/1483 |
| 2022/0329626 A1* | 10/2022 | Sambamoorthy | H04L 63/1483 |
| 2023/0007042 A1* | 1/2023 | Haworth | H04L 63/205 |
| 2023/0224327 A1* | 7/2023 | Haworth | H04L 63/1441 726/23 |

FOREIGN PATENT DOCUMENTS

EP 4044503 8/2022

* cited by examiner

*Primary Examiner* — Baotran N To
(74) *Attorney, Agent, or Firm* — Lee & Hayes, P.C.

(57) ABSTRACT

In some aspects, the techniques described herein relate to a method for detecting malicious emails, the method including: receiving an email, wherein the email is associated with a markup payload; determining, based on the markup payload, text data associated with the email; determining, using the text data and a first machine learning model, a first representation of the email representing text associated with the email; rendering the email to generate image data that represents a rendering of the email; determining, using the image data and a second machine learning model, a second representation of the email that represents at least the rendering of the email; and determining a prediction for the email based on the first representation and the second representation, wherein the prediction represents whether the email is predicted to be malicious based on the first representation and the second representation.

20 Claims, 7 Drawing Sheets

MULTI-MODAL MODELS FOR DETECTING MALICIOUS EMAILS

TECHNICAL FIELD

The present disclosure relates generally to techniques for an email security system to detect malicious email attacks.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malware-less attacks. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for an email security system to detect malicious email attacks. In some aspects, the techniques described herein relate to a method for detecting malicious emails, the method including: receiving an email, wherein the email is associated with a markup payload; determining, based on the markup payload, text data associated with the email; determining, using the text data and a first machine learning model, a first representation of the email representing text associated with the email; rendering the email to generate image data that represents a rendering of the email; determining, using the image data and a second machine learning model, a second representation of the email that represents at least the rendering of the email; and determining a prediction for the email based on the first representation and the second representation, wherein the prediction represents whether the email is predicted to be malicious based on the first representation and the second representation.

Additionally, the techniques described herein may be performed by a system and/or device having non-transitory computer-readable media storing computer-executable instructions that, when executed by one or more processors, performs the method described above.

Example Embodiments

This disclosure describes techniques for an email security system to detect whether an email is malicious. In some cases, the email security system determines a prediction for the email based on at least one of text data associated with the email or image data generated by rendering the markup payload (e.g., a Hypertext Transfer Protocol (HTTP) payload) associated with the email. The prediction for the email may represent whether the email is predicted to be malicious and/or a level of confidence in a prediction that the email is malicious. In some cases, the email security system determines a recommended action to perform with respect to the email based on the prediction for the email. For example, in some cases, based on determining that the email is malicious, the email security system recommends that the email should be prevented from reaching the inbox of the email's recipient. As another example, in some cases, based on determining that the email is not malicious, the email security system recommends that the email be provided in the inbox of the email's recipient.

In some cases, after the email security system receives an email, the email security system scans the HTML payload of the email to determine text data associated with the email and processes the text data using a first machine learning model to determine a first representation of the email. In some cases, in addition to determining the first/text representation, the email security system renders the HTML payload to determine image data associated with the email and processes the image data using a second machine learning model to determine a second/image representation of the email. In some cases, after determining the first representation and the second representation of the email, the email security system determines a prediction based on the first representation and the second representation. For example, the email security system may process the first representation and the second representation using a third machine learning model to determine the prediction.

In some cases, the email security system determines the prediction of an email based on one or more representations of the email in addition to the text representation of textual data associated with the email and the image representation of an image rendering of the email. For example, the email security system may determine the prediction of an email based on at least one of the text representation of textual data associated with the email, an image representation of an image rendering associated with the email, text representation of textual data associated with a webpage corresponding to a uniform resource locator (URL) that is included in the text data for the email, or image representation of an image that is attached to the email. In some cases, the email security system determines a prediction for an email based on one or more text representations of the email that are determined using a first machine learning model that is a text encoder machine learning model and one or more image representations of the email that are determined using a second machine learning model that is an image encoder machine learning model.

In some cases, the techniques described herein include determining text data associated with an email. In some cases, the text data associated with an email include data in a markup payload of the email that is associated with a payload tag that is configured to indicate an alphanumeric character segment. For example, the text data associated with an email may include data in an HTML payload for the email that is associated with one of the following tags: <h1></h1> or <p></p>. In some cases, the text data associated with an email include any string that is displayed as the body of the email. In some cases, the text data associated with an email include text data associated with headers and paragraphs of the email.

In some cases, the text data associated with an email include (e.g., in addition to the text data in a payload of the email) text data associated with at least one webpage linked to in the email. For example, in some cases, the email security system scans the HTML payload of an email to determine if the HTML payload includes any <a> tags. In some cases, in response to determining that the HTML payload includes a set of N webpages linked to through URLs, the email security system loads the N webpages and saves the text data associated with each webpage in a document. In some cases, the text data associated with the email include the text data detected in the email payload as well as the N documents determined based on text data associated with the N webpages that are linked to by the email.

In some cases, the text data associated with an email include (e.g., in addition to the text data in a payload of the email) text data associated with at least one text-based document that is attached. For example, in some cases, the email security system scans each attachment of the email to determine whether the attachment is a text-based document. In some cases, the email security system determines that an attached document is a text-based document if the format of the document indicates that the document includes text data (e.g., if the format indicates that the document has a .txt format) and/or if the format of the document indicates that the document includes image data and the image data is detected to depict text data (e.g., if the format indicates that the document is an image-based Portable Document Format (PDF) document that depicts text data). In some cases, after the email security system determines that the email includes M text-based document attachments, the email security system extracts text data in each of the M text-based document attachments to into a respective document. In some cases, the text data associated with the email include the text data detected in the email payload as well as the M documents determined based on text data associated with the M text-based document attachments of the email.

In some cases, the techniques described herein include determining a text representation of an email. In some cases, to determine the text representation of the email, the email security system processes at least a portion of the text data associated with the email using a text encoder machine learning model. An example of a text encoder machine learning model is a machine learning model that includes an attention-based text encoder layer. For example, in some cases, the text encoder machine learning model includes an attention-based text encoder layer that includes a self-attention mechanism and is trained using a language modeling task, such as using a missing word detection task. In some cases, the text encoder machine learning model includes one or more conventional feedforward neural network layers.

In some cases, the text data associated with an email includes K text documents, where each document is a collection of text data associated with a component of the email. For example, in some cases, the text data associated with an email include at least one of a first document determined based on text data in a payload of the email, one or more second documents each determined based on text data associated with a respective linked webpage of one or more linked webpages associated with the email, and/or one or more third documents each determined based on text data associated with a respective text-based document attachment of one or more text-based documents attachments of the email. In some cases, given an email that is associated with K text documents, K corresponding text representations are determined for the email, where each text representation is the output of processing a respective one of the K text documents using a text encoder machine learning model.

In some cases, the techniques described herein include determining image data for an email. In some cases, to determine the image data for the email, the email security system renders a markup payload (e.g., an HTML payload) of the email. In some cases, one objective behind rendering the markup payload of the email is to avoid the need for processing the various complex markup elements of the markup payload, a task that has become more and more difficult as more complex markup languages (e.g., HTML 5) are developed. For example, in some cases, the HTML payload of the email can have complex Cascading Style Sheets (CSS) elements, such as CSS elements that are configured to depict a visualization (e.g., a logo) in a non-image format, for example to avoid detection of the visualization by image detection models. In some cases, to avoid the need for individual processing of complex markup elements with varied visual effects, the email security system renders a markup payload of the email and uses the resulting image data to classify the email.

In some cases, to render a markup payload of an email, the email security system renders a webpage based on the markup payload and captures a screenshot of the webpage. In some cases, to render a markup payload of the email, the email security system renders a webpage based on the markup payload and prints the webpage into an image-based file (e.g., into a Joint Photographic Experts Group (JPEG) file, into a PDF file, and/or the like). In some cases, to render the markup payload of an email, the email security system provides the markup payload to a rendering engine that provides an image of the markup payload in response to the markup payload.

In some cases, the image data associated with an email includes (e.g., in addition to the image data generated by rendering the markup payload of the email) image data associated with at least one webpage linked to in the email. For example, in some cases, the email security system scans the HTML payload of an email to determine if the HTML payload includes any <a> tags. In some cases, in response to determining that the HTML payload includes a set of N webpages linked to through URLs, the email security system renders the N webpages and saves the renderings associated with each webpage in an image. In some cases, the image data associated with the email include the image data detected in the email payload as well as the N images determined based on renderings of the N webpages that are linked to by the email.

In some cases, the image data associated with an email includes (e.g., in addition to the image data generated by rendering the markup payload of the email) at least any image-based files that are attached to the email. In some cases, the email security system scans each attachment of the email to determine if the attachment is any image-based file. In some cases, the email security system determines that an attachment file is an image-based file if the attachment file has an image format and/or if the attachment file is a PDF file that is detected to not depict text data. For example, in some cases, the email security system processes a PDF file using an object character recognition (OCR) process to determine whether the PDF file includes text data. In some, if the output of the OCR process indicates that the PDF file includes text data, the email security system extracts the text data in the PDF document and uses the text data to determine the overall text data for the email. In some cases, if the output of the OCR process indicates that the PDF file does not include text data, the email security system generates one or more images based on the PDF document and uses the images to determine the overall image data for the email. In some cases, after the email security system detects P image-based files among attachments of the email, the email security system determines P corresponding images based on the P image-based files and uses the determined P images to generate the image data for the email.

In some cases, the techniques described herein include determining an image representation for an email. In some cases, to determine the image representation of the email, the email security system processes at least a portion of the image data associated with the email using an image encoder machine learning model. An example of an image encoder machine learning model is a machine learning model that includes a convolutional neural network layer. In some cases, the image encoder machine learning model includes at least one feedforward fully-connected neural network layer.

In some cases, the image data associated with an email includes P image files. For example, in some cases, the image data associated with an email include at least one of a first image file determined based on a rendering of a payload of the email, one or more second image files each determined based on a rendering of a respective linked webpage of one or more linked webpages associated with the email, and/or one or more third image files each determined based on a respective image-based file attachment of one or more image-based file attachments of the email. In some cases, given an email that is associated with P image files, P corresponding image representations are determined for the email, where each image representation is the output of processing a respective one of the K image files using an image encoder machine learning model, such as an image encoder machine learning model that includes at least one convolutional neural network layer.

In some cases, the techniques described herein include determining a prediction for an email based on one or more text representations for the email and one or more image representations. In some cases, to determine a prediction for the email, the email security system processes a text representation for the email that is determined based on text data in a markup payload of the email and an image representation for the email that is determined based on an image resulting from the rendering of the markup payload to determine the prediction associated with the email. In some cases, the email security system processes the text representation and the image representation using a prediction machine learning model to determine the prediction that is associated with the email. In some cases, the prediction machine learning model includes one or more feedforward fully-connected neural network layers. In some cases, the prediction machine learning model uses an ensemble learning mechanism.

In some cases, a prediction about the email indicates a classification about the email, such as a classification about whether the email is predicted to be malicious, a classification about a level of confidence in a prediction that the email is malicious, a classification that represents a recommended responsive action for the email, and/or the like. In some cases, the prediction about the email is a regression output, such as a regression output that indicates a computed probability that the email is malicious. In some cases, the prediction represents at least one responsive action associated with the email. In some cases, the email security system determines a recommended action to perform with respect to the email based on the prediction for the email. For example, in some cases, based on determining that the email is malicious, the email security system recommends that the email should be prevented from reaching the inbox of the email's recipient. As another example, in some cases, based on determining that the email is not malicious, the email security system recommends that the email be provided in the inbox of the email's recipient. In some cases, the prediction includes a maliciousness prediction that indicates a first likelihood that the email is malicious.

In some cases, the prediction determined by the prediction machine learning model is one of N predictions determined by D maliciousness detector models. In some cases, given D maliciousness detector models used to determine a maliciousness prediction for an email, the maliciousness prediction for the email includes a single score (e.g., a discrete or continuous score) determined by aggregating the D maliciousness detector models. The aggregation may be performed using an ensemble model. In some cases, given D maliciousness detector models used to determine a maliciousness prediction for an email, the maliciousness prediction for the email includes D scores each determined based on the output of a respective one of the D maliciousness detector models. In some cases, given D maliciousness detector models used to determine a maliciousness prediction for an email, the maliciousness prediction for the email includes: (i) D scores each determined based on the output of a respective one of the D maliciousness detector models, and (ii) a single score (e.g., a discrete or continuous score) determined by aggregating the D maliciousness detector models. In some cases, given D maliciousness detector models used to determine a maliciousness prediction for an email, the maliciousness prediction for the email includes a vector of size E that is determined by processing the D outputs of the D maliciousness detector models using a machine learning model that is configured to determine an E-sized (e.g., a dimensionality-reduced) transformed representation of the D outputs.

In some cases, the prediction associated with the email is used to determine a maliciousness verdict for the email. In some cases, the maliciousness verdict for an email indicates whether the email is predicted to be associated with a malicious email attack and/or a recommended remedial action for the email security system to perform in relation to the email. Examples of remedial actions include blocking the email from being displayed in an inbox of the receiver, harvesting data about a malicious email to generate a maliciousness detector model, storing attacker data associated with a malicious email in a blacklist associated with the email security system, reporting attacker data associated with a malicious email to authorities, and/or the like. As described above, in some cases, the maliciousness verdict for an email is determined based on D maliciousness predictions by D maliciousness detector models.

In some cases, the techniques described herein can improve effectiveness of an email security system by enabling the email security system to detect malicious emails based on visual indicators represented by holistic renderings of the emails. As described above, because of the complexity of markup languages, it may be difficult to infer all of the predictively significant features from the markup pay loads of emails. In some cases, to address this challenge, the techniques described herein use an image representation of image data determined by rendering the markup payload of an email to detect whether the email is malicious. Accordingly, by detecting multi-stage malicious attacks based on holistic visual indicators, the techniques described herein improve effectiveness of an email security system and enhance security of computer systems.

In some cases, the techniques described herein can improve computational efficiency and operational speed of an email security system. As described above, in some cases, one objective behind rendering the markup payload of the email is to avoid the need for processing the various complex markup elements of the markup payload, a task that has become more and more difficult as more complex markup languages (e.g., HTML 5) are developed. For example, in some cases, the HTML payload of the email can have complex CSS elements. In some cases, in accordance with the techniques described herein, to avoid the need for individual processing of complex markup elements with varied visual effects, the email security system renders a markup payload of the email and uses the resulting image data to classify the email. Accordingly, by detecting multi-stage malicious attacks based on holistic visual indicators determined based on the markup payload of an email and thus avoiding the need for processing of complex markup payload elements, the techniques described herein improve the computational efficiency and the operational speed of an email security system.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
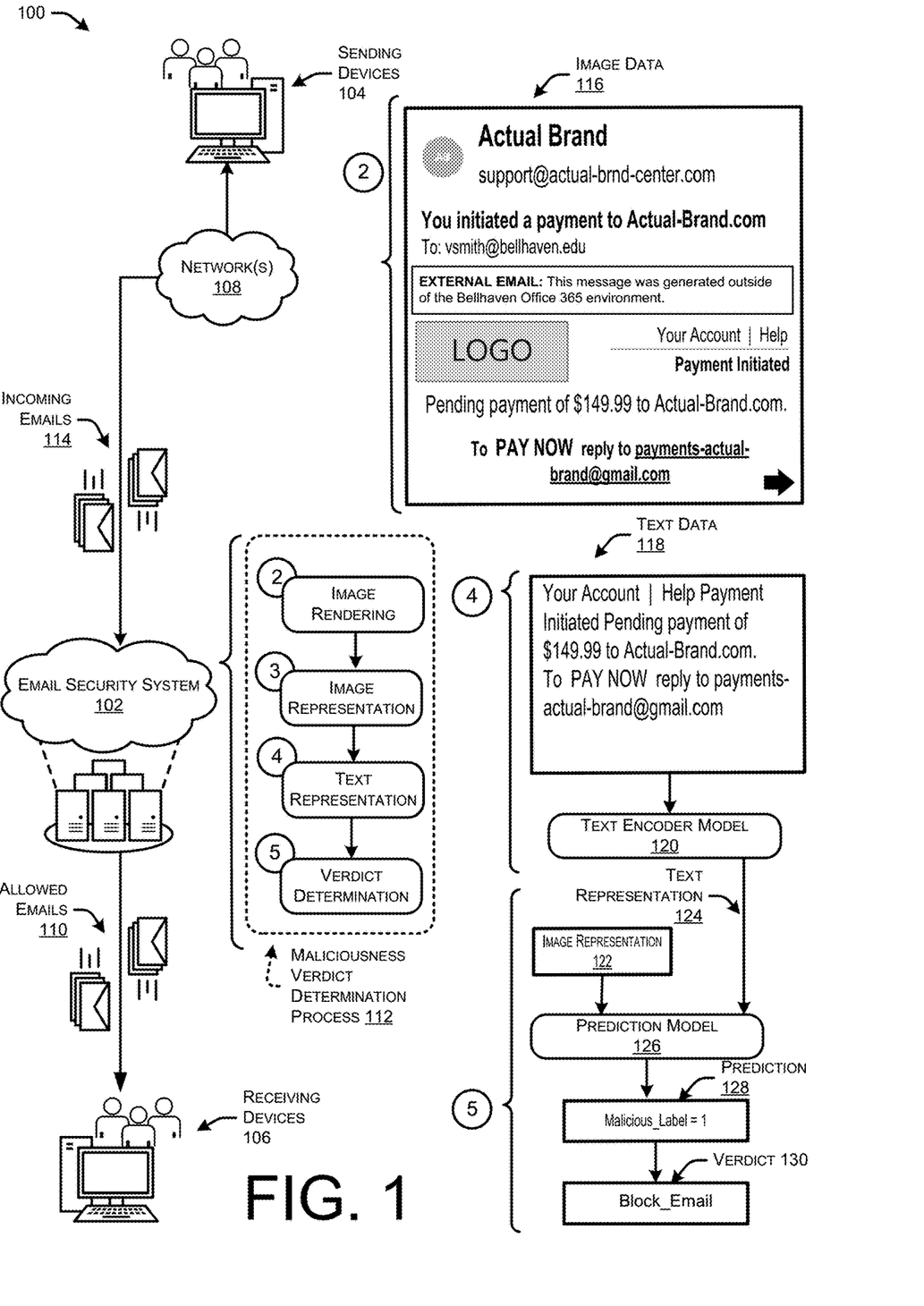
FIG. 1 illustrates a system architecture of an example email security system.

FIG. 1 illustrates a system architecture 100 of an example email security system 102 that generates a maliciousness verdict for an email and determines whether to perform a remedial action with respect to the email based on the maliciousness verdict of the email.

In some instances, the email security system 102 may be a scalable service that includes and/or runs on devices housed or located in one or more data centers, that may be located at different physical locations. In some examples, the email security system 102 may be included in an email platform and/or associated with a secure email gateway platform. The email security system 102 and the email platform may be supported by networks of devices in a public cloud computing platform, a private/enterprise computing platform, and/or any combination thereof. The one or more data centers may be physical facilities or buildings located across geographic areas that designated to store networked devices that are part of and/or support the email security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email security system 102 may be associated with an email service platform may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store and review emails in inboxes, manage and segment contact lists, build email templates, manage and modify inboxes and folders, scheduling, and/or any other operations performed using email service platforms.

The email security system 102 may be included in, or associated with, the email service platform. For instance, the email security system 102 may provide security analysis for emails communicated by the email service platform (e.g., as a secure email gateway). As noted above, the second computing infrastructure may comprise a different domain and/or pool of resources used to host the email security system 102.

The email service platform may provide one or more email services to users of user device to enable the user devices to communicate emails over one or more networks 108, such as the Internet. However, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include sending devices 104 that send emails and receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive incoming emails 114, such as the incoming email 114, that are destined for the receiving devices 106 that have access to inboxes associated with destination email addresses managed by, or provided by, the email service platform. That is, emails are communicated over the network(s) 108 to one or more recipient servers of the email service platform, and the email service platform determines which registered user the email is intended for based on email information such as "To," "Cc," Bcc," and the like. In instances where a user of the receiving device 106 have registered for use of the email security system 102, an organization managing the user devices 104/106 has registered for use of the email security system 102, and/or the email service platform itself has registered for use of the email security system 102, the email service platform may provide the appropriate emails for pre-preprocessing of the security analysis process.

In some cases, the email security system 102 may determine a maliciousness verdict for an incoming email 114 using the maliciousness verdict determination process 112. The maliciousness verdict may then be used to determine whether an incoming email 114 should be blocked or instead should be provided to the receiving devices 106 as an allowed email 110. To determine the maliciousness verdict, the email security system 102 may analyze the email metadata with reference to the security policies to determine whether or not the email metadata violates one or more security policies that indicate the respective email is potentially malicious. In some instances, rule-based heuristics may be developed to identify malicious emails based on different words, patterns, and/or other information included in the emails. As another example, machine learning model (s) may be trained using emails where malicious emails are labeled as malicious and benign or normal emails are labeled as benign. The machine learning model(s) and/or the rule-based heuristics may output probabilities that emails are malicious, or may simply output a positive or negative result as to whether the emails are malicious or not.

As depicted in FIG. 1, at operation (1), the email security system 102 may receive an incoming email 114 and determine image data 116 for the email by rendering the markup payload of the incoming email 114. In some cases, to render a markup payload of an incoming email 114, the email security system 102 renders a webpage based on the markup payload and captures a screenshot of the webpage. In some cases, to render a markup payload of an incoming email 114, the email security system 102 renders a webpage based on the markup payload and prints the webpage into an image-based file (e.g., into a JPEG file, into a PDF file, and/or the like). In some cases, to render the markup payload of an incoming email 114, the email security system 102 provides the markup payload to a rendering engine that provides an image of the markup payload in response to the markup payload.

An operational example of image data 116 for an incoming email 114 is depicted in FIG. 1. As depicted in FIG. 1, the image data 116 includes an image that is determined by rendering a markup payload of the incoming email 114.

As further depicted in FIG. 1, at operation (2), the email security system 102 may determine an image representation 122 of the image data 116. In some cases, to determine the image representation 122 of the image data 116 for an incoming email 114, the email security system 102 processes at least a portion of the image data 116 associated with the incoming email 114 using an image encoder machine learning model. An example of an image encoder machine learning model is a machine learning model that includes a convolutional neural network layer. In some cases, the image encoder machine learning model includes at least one feedforward fully-connected neural network layer.

In some cases, the image data 116 associated with an incoming email includes P image files. For example, in some cases, the image data 116 associated with an incoming email 114 include at least one of a first image file determined based on a rendering of a payload of the incoming email 114, one or more second image files each determined based on a rendering of a respective linked webpage of one or more linked webpages associated with the incoming email 114, and/or one or more third image files each determined based on a respective image-based file attachment of one or more image-based file attachments of the email. In some cases, given an incoming email 114 that is associated with P image files, P corresponding image representations are determined for the email, where each image representation is the output of processing a respective one of the K image files using an image encoder machine learning model, such as an image encoder machine learning model that includes at least one convolutional neural network layer.

As further depicted in FIG. 1, at operation (3), the email security system 102 determines text data 118 associated with the incoming email 114. In some cases, the email security system 102 determines text data 118 associated with the incoming email 114 based on text data in a markup payload of the incoming email 114. In some cases, the text data 118 associated with the incoming email 114 include data in a markup payload of the incoming email 114 that is associated with a payload tag that is configured to indicate an alphanumeric character segment. For example, the text data 118 associated with an incoming email 114 may include data in an HTML payload for the incoming email 114 that is associated with one of the following tags: <h1></h1> or <p></p>. In some cases, the text data 118 associated with an email include any string that is displayed as the body of the incoming email 114. In some cases, the text data associated with an incoming email 114 include text data associated with headers and paragraphs of the incoming email 114.

An operational example of text data 118 for an incoming email 114 is depicted in FIG. 1. As depicted in FIG. 1, the text data 118 includes text strings included in a markup payload of the incoming email 114. The text data 118 may be extracted by scanning the markup payload for text-related fields/tags and determining text strings associated with the detected fields/tags.

As further depicted in FIG. 1, at operation (4), the email security system 102 determines a text representation 124 for the text data 118. In some cases, to determine the text representation 124, the email security system 102 processes at least a portion of the text data 118 associated with the email using a text encoder machine learning model 120. An example of a text encoder machine learning model 120 is a machine learning model that includes an attention-based text encoder layer. For example, in some cases, the text encoder machine learning model 120 includes an attention-based text encoder layer that includes a self-attention mechanism and is trained using a language modeling task, such as using a missing word detection task. In some cases, the text encoder machine learning model includes one or more conventional feedforward neural network layers.

In some cases, the text data associated with an incoming email 114 includes K text documents, where each document is a collection of text data associated with a component of the incoming email 114. For example, in some cases, the text data associated with an incoming email 114 include at least one of a first document determined based on text data in a payload of the email, one or more second documents each determined based on text data associated with a respective linked webpage of one or more linked webpages associated with the email, and/or one or more third documents each determined based on text data associated with a respective text-based document attachment of one or more text-based documents attachments of the email. In some cases, given an email that is associated with K text documents, K corresponding text representations are determined for the email, where each text representation is the output of processing a respective one of the K text documents using a text encoder machine learning model 120.

As further depicted in FIG. 1, at operation (5), the email security system 102 determines a maliciousness verdict 130 for the incoming email 114 based on one or more image representations 122 and one or more text representations 124 of the incoming email 114. In some cases, to determine the maliciousness verdict 130 for the incoming email 114, the email security system 102 first processes the one or more image representations 122 and the one or more text representations 124 of the incoming email 114 using a prediction model 126 to determine a prediction 128 associated with the incoming email 114, and then proceeds to determine the maliciousness verdict 130 for the incoming email 114 based on the determined prediction 128 for the incoming email.

In some cases, to determine a prediction 128 for the incoming email 114, the email security system 102 processes a text representation 124 for the email that is determined based on text data 118 in a markup payload of the incoming email 114 and an image representation 122 for the incoming email 114 that is determined based on image data 116 resulting from the rendering of the markup payload to determine the prediction 128 associated with the email. In some cases, the email security system processes the text representation 124 and the image representation 122 using a prediction machine learning model 126 to determine the prediction 128 associated with the incoming email 114. In some cases, the prediction machine learning model 126 includes one or more feedforward fully-connected neural network layers. In some cases, the prediction machine learning model 126 uses an ensemble mechanism.

In some cases, a prediction 128 about the incoming email 114 indicates a classification about the incoming email 114, such as a classification about whether the incoming email 114 is predicted to be malicious, a classification about a level of confidence in a prediction that the incoming email 114 is malicious, a classification that represents a recommended responsive action for the incoming email 114, and/or the like. In some cases, the incoming email 114 about the email is a regression output, such as a regression output that indicates a computed probability that the incoming email 114 is malicious. In some cases, the prediction represents at least one responsive action associated with the incoming email 114.

In some cases, the maliciousness verdict 130 for the incoming email 114 indicates whether the email is predicted to be associated with a malicious email attack and/or a recommended remedial action for the email security system to perform in relation to the incoming email 114. Examples of remedial actions include blocking the incoming email 114 from being displayed in an inbox of the receiver, harvesting data about the incoming email 114 to generate a maliciousness detector model, storing attacker data associated with the incoming email 114 in a blacklist associated with the email security system, reporting attacker data associated with the incoming email 114 to authorities, and/or the like.

Figure 2:
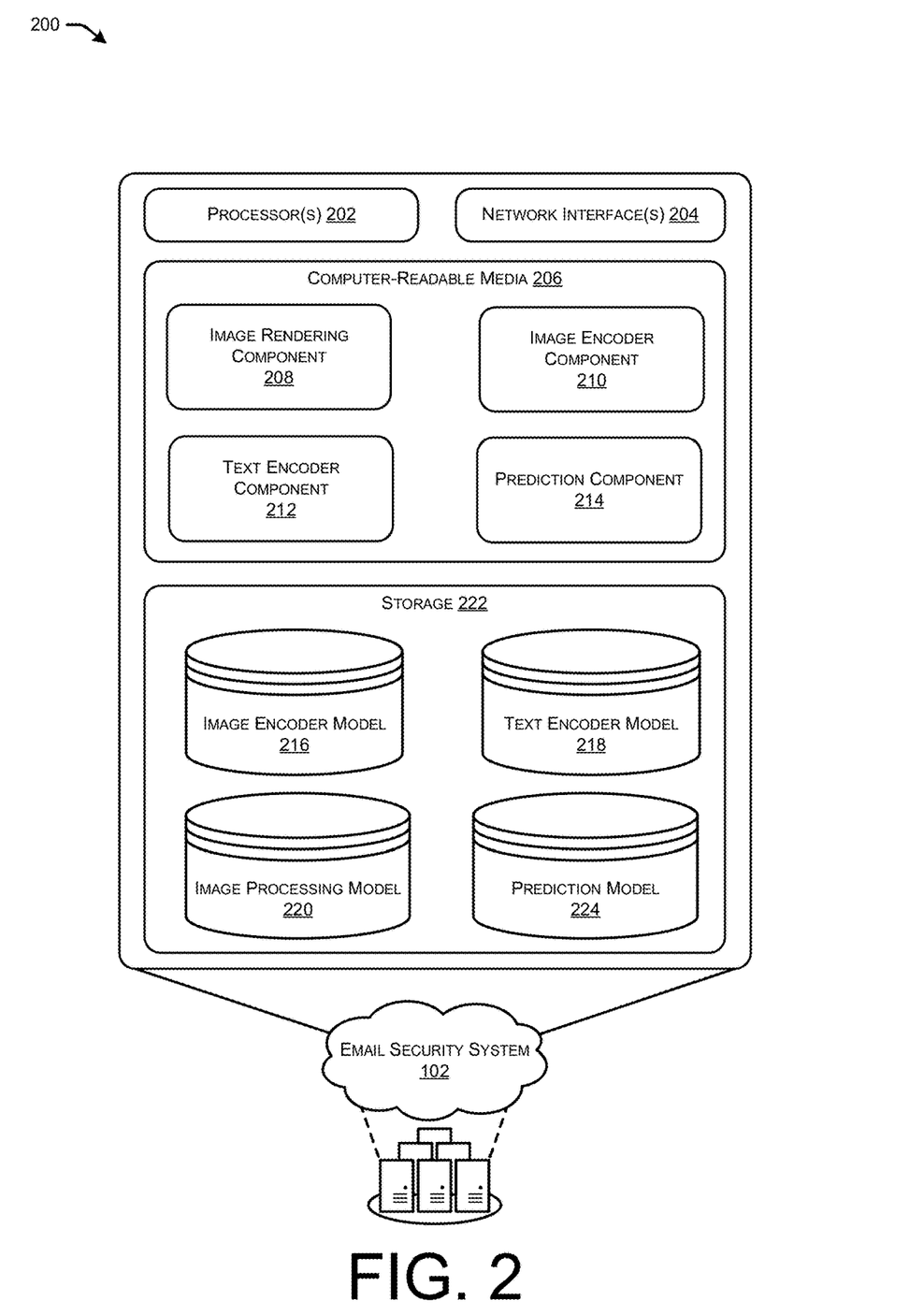
FIG. 2 illustrates a component diagram of an email security system.

FIG. 2 illustrates a component diagram 200 of the example email security system 102 of FIG. 1. As depicted in FIG. 1, the email security system 102 may include one or more hardware processors 202 (processors), which may be one or more devices configured to execute one or more stored instructions. The processor(s) 202 may comprise one or more cores. Further, the email security system 102 may include one or more network interfaces 204 configured to provide communications between the email security system 102 and other devices, such as the sending device(s) 104, receiving devices 106, and/or other systems or devices associated with an email service providing the email communications. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The email security system 102 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the email security system 102. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the email security system 102 may include storage 222 which may comprise one, or multiple, repositories or other storage locations for persistently storing and managing collections of data such as databases, simple files, binary, and/or any other data. The storage 222 may include one or more storage locations that may be managed by one or more storage/database management systems. For example, the storage 222 may store an image rendering model 216 that includes computer-readable instructions for rendering a markup payload, such as the markup payload of an email. As another example, the storage 222 may include a text encoder model 218 (e.g., the text encoder model 120) that includes computer-readable instructions for determining a text representation for text data, such as text data determined based on text strings in text-receiving fields of a markup payload of an email. As an additional example, the storage 222 may include an image encoder model 220 that includes computer-readable instructions for determining an image representation of image data associated with an email. As an additional example, the storage 222 may include a prediction model 224 that includes computer-readable instructions for determining at least one prediction for an email based on the image representation of the email and the text representation of the email.

The computer-readable media 206 may include portions, or components, that configure the email security system 102 to perform various operations described herein. For example, an image rendering component 208 may be configured to execute instructions of the image rendering model 216 to render a markup payload of an email. As another example, the image encoder component 210 may be configured to execute instructions of the image encoder model 220 to determine an image representation of image data of an email. As yet another example, the text encoder component 212 may be configured to execute instructions of the text encoder model 218 to determine a text representation of text data of an email. As a further example, the prediction component 214 may be configured to execute instructions of the prediction model 224 to determine at least one prediction for an email based on the image representation of the email and the text representation of the email.

Figure 3:
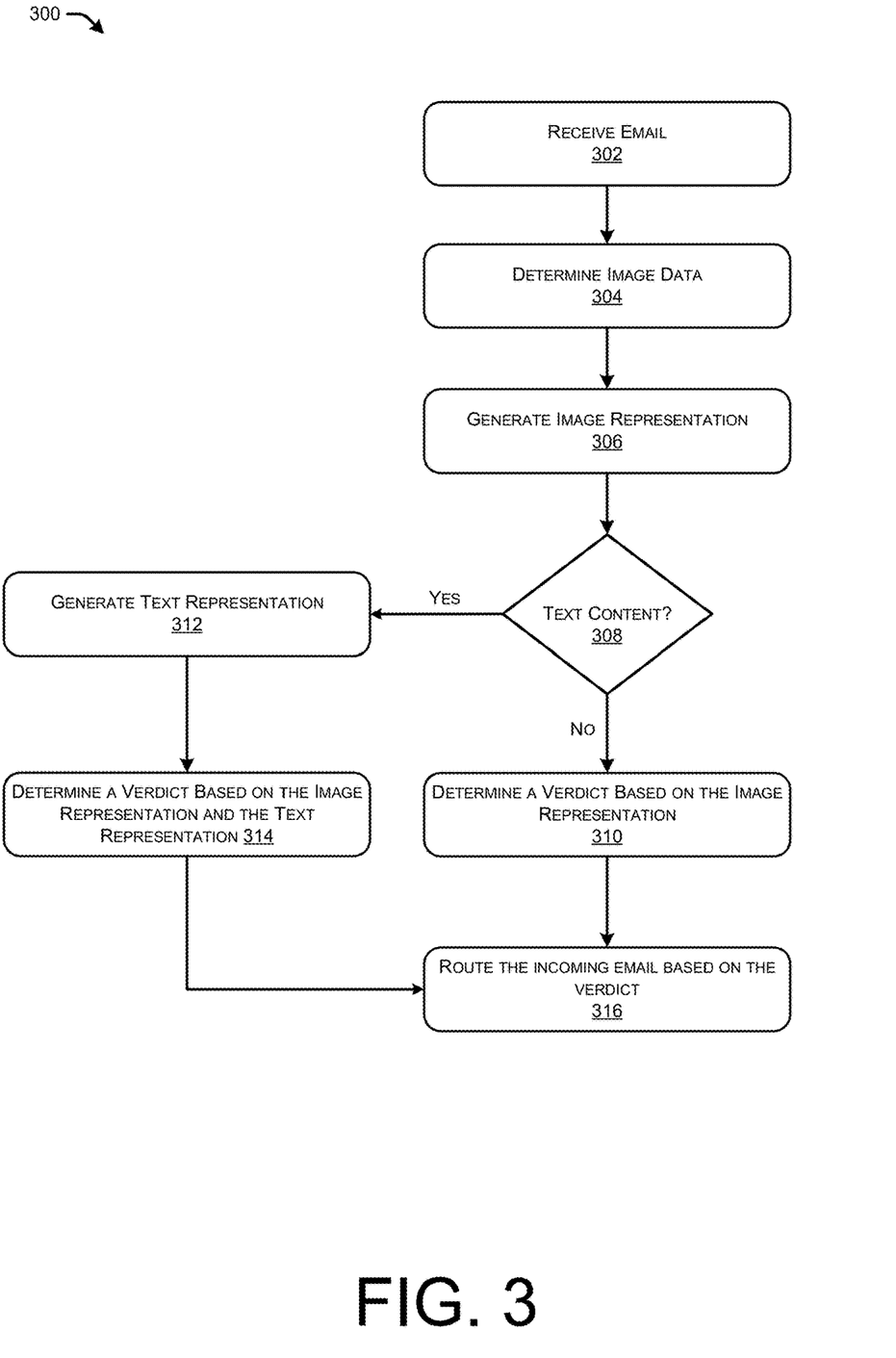
FIG. 3 provides a flowchart diagram of an example process for determining a responsive action for an email.

FIG. 3 provides a flowchart diagram of an example process 300 for determining a responsive action for an email. As depicted in FIG. 3, at operation 302, the process 300 includes receiving an email. In some cases, the email is associated with a markup payload (e.g., an HTML payload).

At operation 304, the process 300 includes determining image data for the email. In some cases, to determine the image data for the email, the email security system renders a markup payload (e.g., an HTML payload) of the email. In some cases, to render a markup payload of an email, an email security system renders a webpage based on the markup payload and captures a screenshot of the webpage. In some cases, to render a markup payload of the email, the email security system renders a webpage based on the markup payload and prints the webpage into an image-based file.

At operation 306, the process 300 includes determining an image representation of the email based on the image data. In some cases, to determine the image representation of the email, an email security system processes at least a portion of the image data associated with the email using an image encoder machine learning model. An example of an image encoder machine learning model is a machine learning model that includes a convolutional neural network layer. In some cases, the image encoder machine learning model includes at least one feedforward fully-connected neural network layer.

At operation 308, the process 300 includes determining whether the email is associated with text data. In some cases, an email security system determines that the email is associated with text data based at least in part on whether a text-receiving field/tag of the markup payload of the email includes a text string parameter. Examples of text-receiving tags include the following HTML tags: <h1></h1> or <p></p>. In some cases, an email security system determines that the email is associated with text data based at least in part on whether the markup payload of the email includes any text contents.

At operation 310, the process 300 includes determining a maliciousness verdict for the email based on the image representation based on (e.g., in response to) determining that the email is not associated with text data. In some cases, to determine the maliciousness verdict at operation 310, an email security provides the image representation and a null (e.g., all zero) text representation as inputs to a prediction model to determine a prediction (e.g., a classification) for the email. In some cases, after determining the prediction associated with the email, the email security system uses the prediction to determine a maliciousness verdict for the email. In some cases, the maliciousness verdict indicates whether the email is predicted to be associated with a malicious email attack and/or a recommended remedial action for the email security system to perform in relation to the email. Examples of remedial actions include blocking the email from being displayed in an inbox of the receiver, harvesting data about the email to generate a maliciousness detector model, storing attacker data associated with the email in a blacklist associated with the email security system, reporting attacker data associated with the email to authorities, and/or the like.

At operation 312, the process 300 includes determining a text representation of the text data associated with the email based on (e.g., in response to) determining that the email is associated with text data. In some cases, to determine the text representation of the email, an email security system processes at least a portion of the text data associated with the email using a text encoder machine learning model. An example of a text encoder machine learning model is a machine learning model that includes an attention-based text encoder layer. For example, in some cases, the text encoder machine learning model includes an attention-based text encoder layer that includes a self-attention mechanism and is trained using a language modeling task, such as using a missing word detection task. In some cases, the text encoder machine learning model includes one or more conventional feedforward neural network layers.

At operation 314, the process 300 includes determining a maliciousness verdict for the email based on the image representation and the text representation of the email. In some cases, an email security system processes the image representation and the text representation of the email to determine a prediction (e.g., a classification, a regression output, and/or the like) that then may be used to determine a maliciousness verdict for the email. As described above, in some cases, the maliciousness verdict indicates whether the email is predicted to be associated with a malicious email attack and/or a recommended remedial action for the email security system to perform in relation to the email.

At operation 316, the process 300 includes routing the email based on the maliciousness verdict (e.g., the maliciousness verdict determined at operation 310 for an email without text data and at operation 312 for an email with text data). In some cases, the maliciousness verdict for the incoming email indicates whether the incoming email is associated with a recommended responsive action of blocking. In some cases, if the maliciousness verdict indicates that the incoming email is associated with a recommended responsive action of blocking, an email security system routes the incoming email by blocking the incoming email from being sent to the receiver. In some cases, if the maliciousness verdict indicates that the incoming email is not associated with a recommended responsive action of blocking, an email security system routes the incoming email by sending the incoming email to the receiver.

Figure 4:
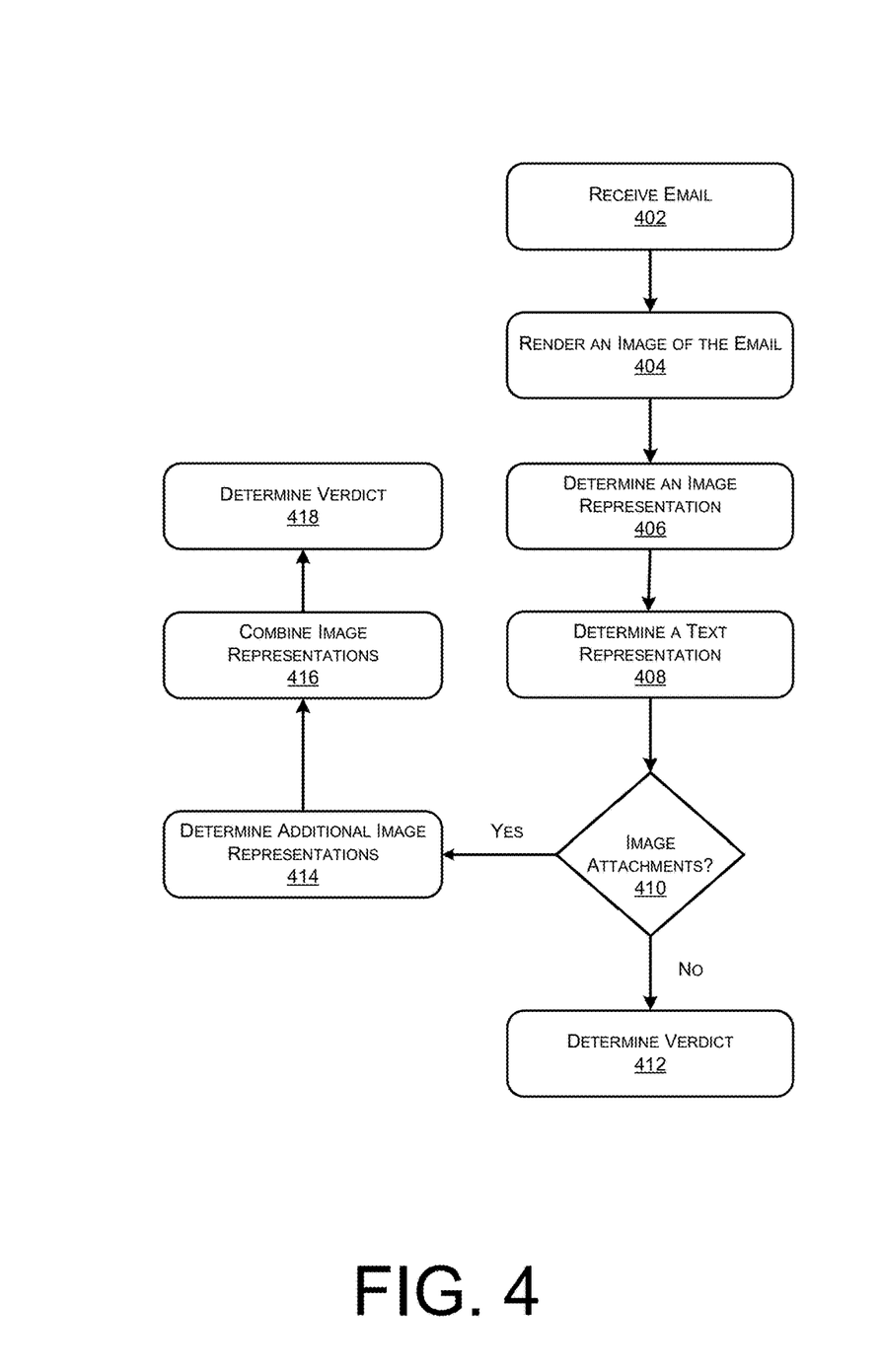
FIG. 4 is a flowchart diagram of an example process for determining a maliciousness verdict for an email.

FIG. 4 is a flowchart diagram of an example process 400 for determining a maliciousness verdict for an email. As depicted in FIG. 4, at operation 402, the process 400 includes receiving an email. cases, the email is associated with a markup payload (e.g., an HTML payload).

At operation 404, the process 400 includes determining image data for the email. In some cases, to determine the image data for the email, an email security system renders a markup payload (e.g., an HTML payload) of the email. In some cases, to render a markup payload of an email, an email security system renders a webpage based on the markup payload and captures a screenshot of the webpage.

At operation 406, the process 400 includes determining an image representation of the email based on the image data. In some cases, to determine the image representation of the email, an email security system processes at least a portion of the image data associated with the email using an image encoder machine learning model.

At operation 408, the process 400 includes determining a text representation of the email based on the text data associated with the email. In some cases, the text data associated with an email include data in a markup payload of the email that is associated with a payload tag that is configured to indicate an alphanumeric character segment. For example, the text data associated with an email may include data in an HTML payload for the email that is associated with one of the following tags: <h1></h1> or <p></p>. In some cases, the text data associated with an email include any string that is displayed as the body of the email. In some cases, the text data associated with an email include text data associated with headers and paragraphs of the email. In some cases, to determine the text representation of the email, an email security system processes at least a portion of the text data associated with the email using a text encoder machine learning model.

At operation 410, the process 400 includes whether the email includes any image-based file attachments. In some cases, an email security system scans each attachment of the email to determine if the attachment is any image-based file. In some cases, the email security system determines that an attachment file is an image-based file if the attachment file has an image format and/or if the attachment file is a PDF file that is detected to not depict text data.

At operation 412, the process 400 includes determining the maliciousness verdict for the email based on the image representation as determined at operation 406 and the text representation as determined at operation 408 based on (e.g., in response to) determining that the email does not have any image-based file attachments. In some cases, an email security system processes the image representation and the text representation of the email to determine a prediction (e.g., a classification, a regression output, and/or the like) that then may be used to determine a maliciousness verdict for the email. As described above, in some cases, the maliciousness verdict indicates whether the email is predicted to be associated with a malicious email attack and/or a recommended remedial action for the email security system to perform in relation to the email.

At operation 414, the process 400 includes determining additional image representations for the email based on image-based file attachments of the email based on (e.g., in response to) determining that the email has one or more image-based file attachments. In some cases, after the email security system detects P image-based files among attachments of the email, the email security system determines P corresponding images based on the P image-based files and uses the determined P images to generate the image data for the email. In some cases, after generating the P images, the email security system determines P image representations including an image representation for each of the P images that is generated (e.g., by processing the image using the same image encoder machine learning model as the one used to determine the image representation at operation 406).

At operation 416, the process 400 includes combining the additional image representations to generate a combined image representation based on (e.g., in response to) determining that the email has one or more image-based file attachments. In some cases, to determine the combined image representation, an email security system combines (e.g., using a concatenation operation, using a neural network layer, and/or the like) the additional image representations. In some cases, to determine the combined image representation, an email security system combines (e.g., using a concatenation operation, using a neural network layer, and/or the like) the additional image representations and the image representation determined at operation 406.

At operation 418, the process 400 includes determining the maliciousness verdict for the email based on the combined image representation as determined at operation 418 and the text representation as determined at operation 408 based on (e.g., in response to) determining that the email has one or more image-based file attachments. In some cases, an email security system processes the combined image representation and the text representation of the email to determine a prediction (e.g., a classification, a regression output, and/or the like) that then may be used to determine a maliciousness verdict for the email. As described above, in some cases, the maliciousness verdict indicates whether the email is predicted to be associated with a malicious email attack and/or a recommended remedial action for the email security system to perform in relation to the email.

Figure 5:
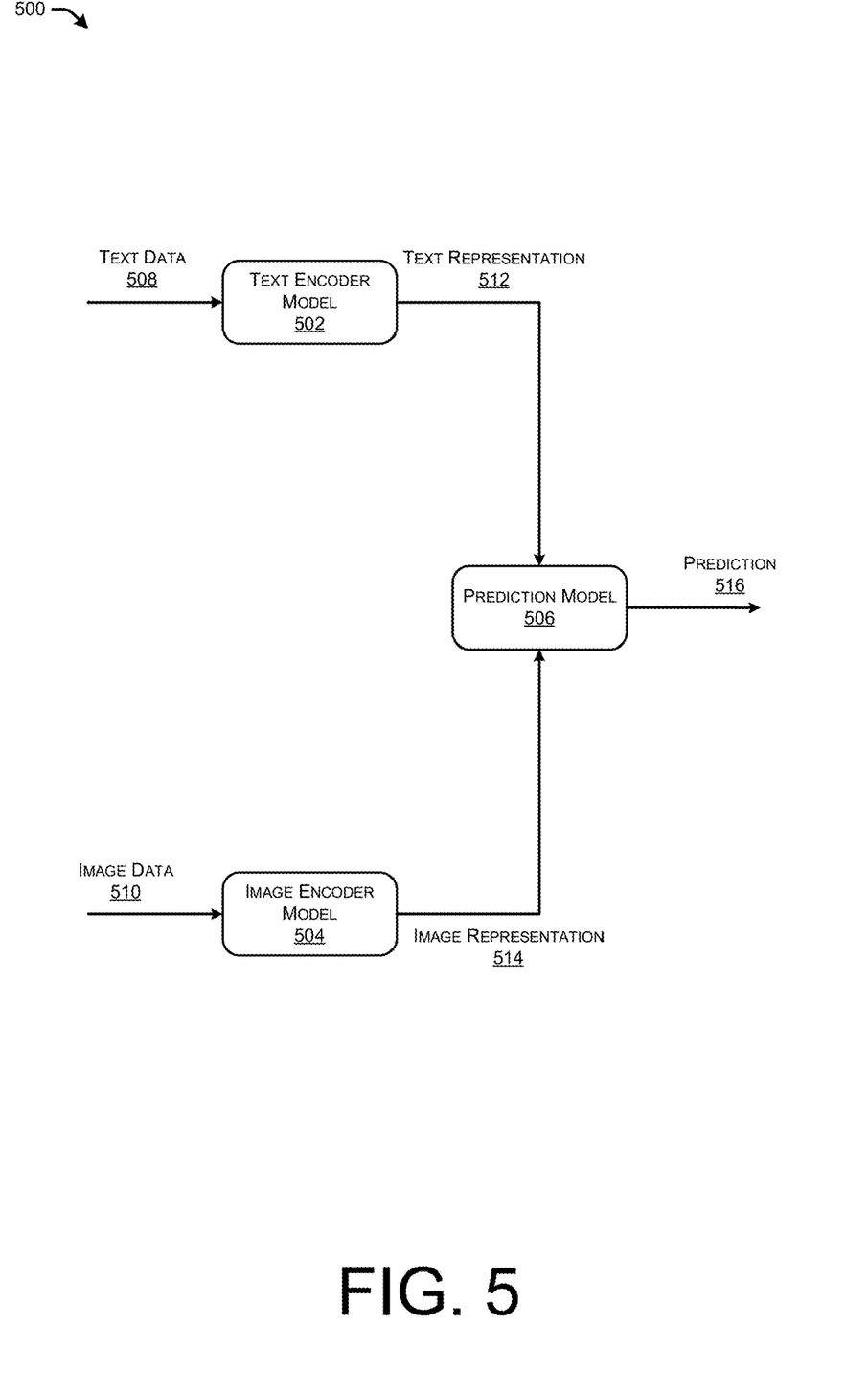
FIG. 5 provides an operational example of a machine learning framework for determining a prediction for an email.

FIG. 5 provides an operational example of a machine learning framework 500 for determining a prediction 516 (e.g., a maliciousness prediction) for an email. As depicted in FIG. 5, the machine learning framework includes a text encoder machine learning model 502, an image encoder model 504, and a prediction model 506. The text encoder machine learning model 502 may be configured to generate a text representation 512 for an email based on text data 508 associated with the email. An example of a text encoder machine learning model is a machine learning model that includes an attention-based text encoder layer. For example, in some cases, the text encoder machine learning model includes an attention-based text encoder layer that includes a self-attention mechanism and is trained using a language modeling task, such as using a missing word detection task. In some cases, the text encoder machine learning model includes one or more conventional feedforward neural network layers.

The image encoder model 504 may be configured to generate an image representation 514 for an email based on image data 510 associated with the email. An example of an image encoder machine learning model is a machine learning model that includes a convolutional neural network layer. In some cases, the image encoder machine learning model includes at least one feedforward fully-connected neural network layer.

The prediction model 506 may be configured to determine the prediction 516 for the email based on the text representation 512 of the email and the image representation 514 of the email. In some cases, the prediction machine learning model includes one or more feedforward fully-connected neural network layers. In some cases, the prediction machine learning model uses an ensemble learning mechanism. In some cases, the prediction 516 indicates a classification about the email, such as a classification about whether the email is predicted to be malicious, a classification about a level of confidence in a prediction that the email is malicious, a classification that represents a recommended responsive action for the email, and/or the like. In some cases, the prediction 516 includes a regression output, such as a regression output that indicates a computed probability that the email is malicious. In some cases, the prediction 516 represents at least one responsive action associated with the email. In some cases, the email security system determines a recommended action to perform with respect to the email based on the prediction for the email.

Figure 6:
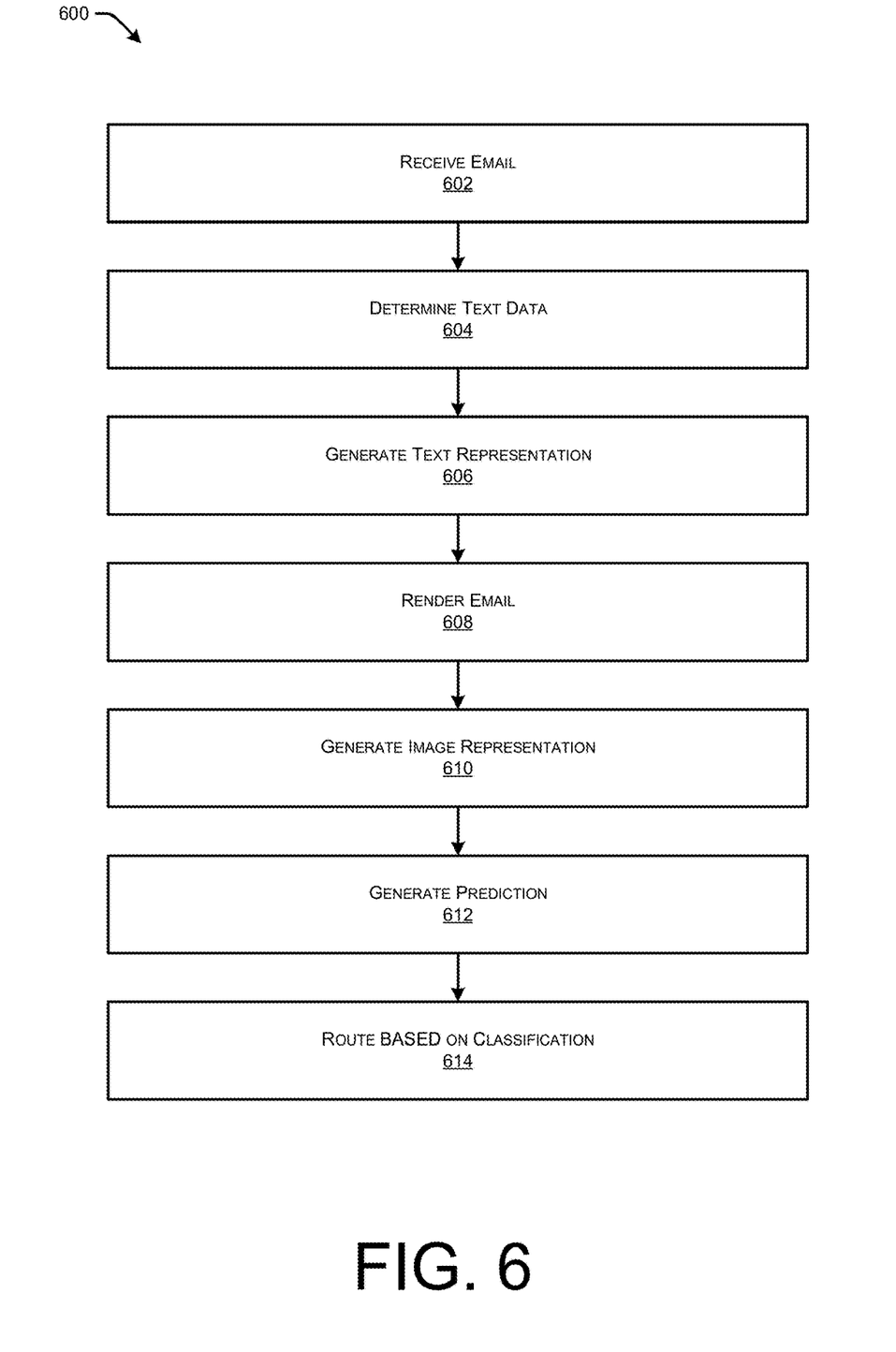
FIG. 6 provides a flowchart diagram of an example process for routing an email based on a prediction about the email.

FIG. 6 provides a flowchart diagram of an example process 600 for routing an email based on a prediction about the email. As depicted in FIG. 6, at operation 602, the process 600 includes receiving an email. cases, the email is associated with a markup payload (e.g., an HTML payload).

At operation 604, the process 600 includes determining text data for the email. In some cases, the text data associated with an email include data in a markup payload of the email that is associated with a payload tag that is configured to indicate an alphanumeric character segment. For example, the text data associated with an email may include data in an HTML payload for the email that is associated with one of the following tags: <h1></h1> or <p></p>.

At operation 606, the process 600 includes generating a text representation of the email. In some cases, to determine the text representation of the email, an email security system processes at least a portion of the text data associated with the email using a text encoder machine learning model.

At operation 608, the process 600 includes rendering a markup payload of the email to generate image data for the email. In some cases, to render a markup payload of an email, an email security system renders a webpage based on the markup payload and captures a screenshot of the webpage. In some cases, to render a markup payload of the email, the email security system renders a webpage based on the markup payload and prints the webpage into an image-based file. In some cases, to render the markup payload of an email, the email security system provides the markup payload to a rendering engine that provides an image of the markup payload in response to the markup payload.

At operation 610, the process 600 includes generating an image representation of the email. In some cases, to determine the image representation of the email, an email security system processes at least a portion of the image data associated with the email using an image encoder machine learning model.

At operation 612, the process 600 includes determining a prediction for the email. In some cases, to determine a prediction for the email, the email security system processes a text representation for the email that is determined based on text data in a markup payload of the email and an image representation for the email that is determined based on an image resulting from the rendering of the markup payload to determine the prediction associated with the email. In some cases, the email security system processes the text representation and the image representation using a prediction machine learning model to determine the prediction that is associated with the email. In some cases, a prediction about the email indicates a classification about the email, such as a classification about whether the email is predicted to be malicious, a classification about a level of confidence in a prediction that the email is malicious, a classification that represents a recommended responsive action for the email, and/or the like. In some cases, the prediction about the email is a regression output, such as a regression output that indicates a computed probability that the email is malicious.

At operation 614, the process 600 includes determining whether to route the email based on the prediction. For example, in some cases, based on determining that the email is malicious, an email security system recommends that the email should be prevented from reaching the inbox of the email's recipient. As another example, in some cases, based on determining that the email is not malicious, the email security system recommends that the email be provided in the inbox of the email's recipient.

Figure 7:
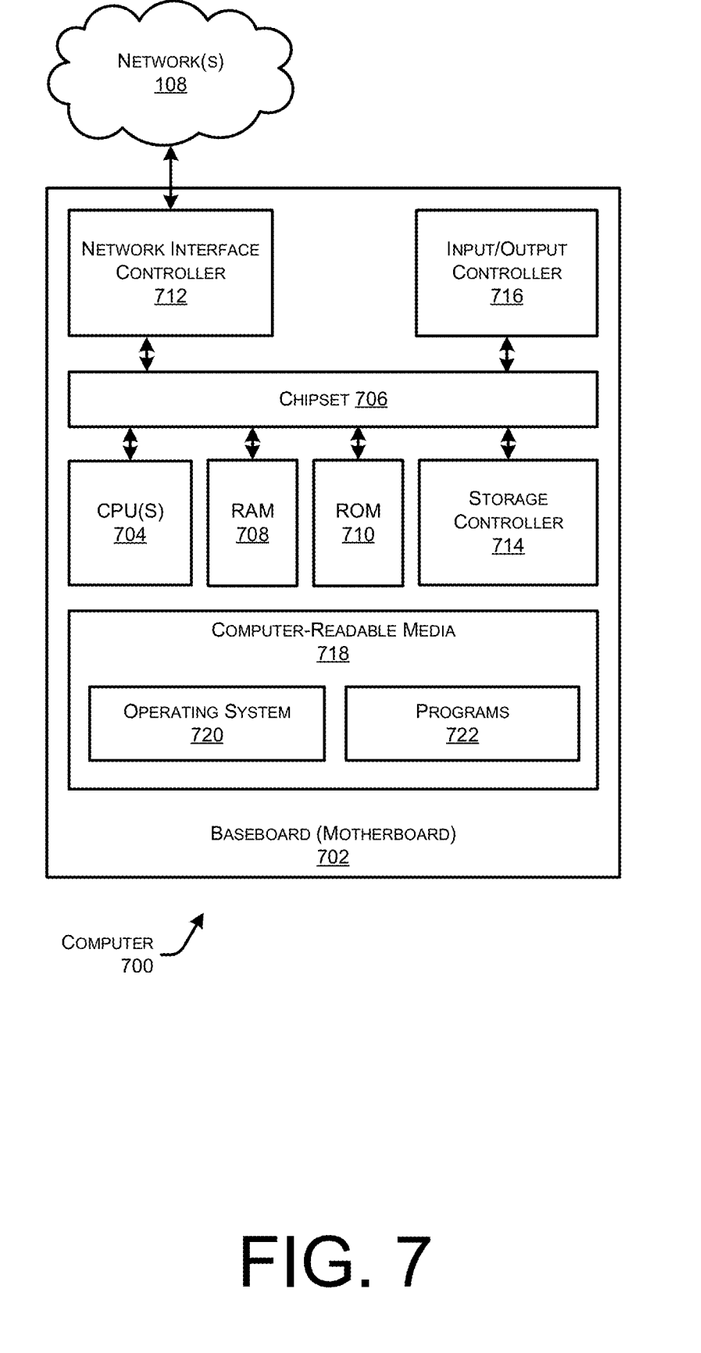
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to a physical server that is included in the email security system 102 described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM")

for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 108. The chipset 706 can include functionality for providing network connectivity through a NIC 712, such as a gigabit Ethernet adapter. The NIC 712 is capable of connecting the computer 700 to other computing devices over the network 108. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations are performed by devices in a distributed application architecture, and or any components included therein, may be supported by one or more devices similar to computer 700. Stated otherwise, some or all of the operations performed by the email security system 102, and or any components included therein, may be performed by one or more computer devices 700 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-8. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for detecting malicious emails, the method comprising:
    receiving an email, wherein the email is associated with a markup payload:
    determining, based on the markup payload, text data associated with the email;
    determining, using the text data and a first machine learning model, a first representation of the email representing text associated with the email;
    rendering the email to generate image data that represents a rendering of the email;
    determining, using the image data and a second machine learning model, a second representation of the email that represents at least the rendering of the email; and
    determining a prediction for the email based on the first representation and the second representation, wherein the prediction represents whether the email is predicted to be malicious based on the first representation and the second representation.

2. The method of claim 1, wherein determining the prediction comprises:
    providing the first representation and the second representation to a third machine learning model, wherein the third machine learning model is configured to determine the prediction based on the first representation and the second representation; and
    receiving the prediction from the third machine learning model.

3. The method of claim 1, further comprising:
    based at least in part on determining that the prediction indicates that the email is malicious, determining a remedial action for the email; and
    processing the email based on the remedial action.

4. The method of claim 1, wherein the first machine learning model comprises an attention-based text encoder layer.

5. The method of claim 1, wherein the second machine learning model comprises a convolutional neural network layer.

6. The method of claim 1, wherein:
    the method further comprises:
        determining second image data based on an attached image file associated with the email,
        providing the second image data to the second machine learning model, and
        receiving, from the second machine learning model, a third representation of the email; and
    the prediction is determined based on the first representation, the second representation, and the third representation.

7. The method of claim 1, wherein:
    the method further comprises:
        determining third image data based on an image associated with a uniform resource locator (URL) included in the email,
        providing the third image data to the second machine learning model, and
        receiving, from the second machine learning model, a fourth representation of the email; and
    the prediction is determined based on the first representation, the second representation, and the fourth representation.

8. The method of claim 1, wherein:
    the method further comprises:
        determining second text data based on content data associated with a uniform resource locator (URL) included in the email,
        providing the second text data to the first machine learning model, and
        receiving, from the second machine learning model, a fourth representation of the email; and
    the prediction is determined based on the first representation, the second representation, and the fourth representation.

9. A system comprising:
    one or more processors; and
    one or more non-transitory computer-readable media storing computer-executable instructions that, when executed by the one or more processors, cause the one or more processors to perform operations comprising:
    receiving an email, wherein the email is associated with a markup payload:
    determining, based on the markup payload, text data associated with the email:
    determining, using the text data and a first machine learning model, a first representation of the email representing text associated with the email;
    rendering the email to generate image data that represents a rendering of the email;
    determining, using the image data and a second machine learning model, a second representation of the email that represents at least the rendering of the email; and
    determining a prediction for the email based on the first representation and the second representation, wherein the prediction represents whether the email is predicted to be malicious based on the first representation and the second representation.

10. The system of claim 9, wherein determining the prediction comprises:
    providing the first representation and the second representation to a third machine learning model, wherein the third machine learning model is configured to determine the prediction based on the first representation and the second representation; and
    receiving the prediction from the third machine learning model.

11. The system of claim 9, the operations further comprising:
    based at least in part on determining that the prediction indicates that the email is malicious, determining a remedial action for the email; and
    processing the email based on the remedial action.

12. The system of claim 9, wherein the first machine learning model comprises an attention-based text encoder layer.

13. The system of claim 9, wherein the second machine learning model comprises a convolutional neural network layer.

14. The system of claim 9, wherein:
    the operations further comprise:
        determining second image data based on an attached image file associated with the email,
        providing the second image data to the second machine learning model, and receiving, from the second machine learning model, a third representation of the email; and the prediction is determined based on the first representation, the second representation, and the third representation.

15. The system of claim 9, wherein:

the operations further comprise:

determining third image data based on an image associated with a uniform resource locator (URL) included in the email, providing the third image data to the second machine learning model, and receiving, from the second machine learning model, a fourth representation of the email; and the prediction is determined based on the first representation, the second representation, and the fourth representation.

16. The system of claim 9, wherein:

the operations further comprise:

determining second text data based on content data associated with a uniform resource locator (URL) included in the email, providing the second text data to the first machine learning model, and receiving, from the second machine learning model, a fourth representation of the email; and the prediction is determined based on the first representation, the second representation, and the fourth representation.

17. One or more non-transitory computer-readable media storing computer-executable instructions that, when executed by one or more processors, cause the one or more processors to perform operations comprising:

receiving an email, wherein the email is associated with a markup payload;

determining, based on the markup payload, text data associated with the email;

determining, using the text data and a first machine learning model, a first representation of the email representing text associated with the email;

rendering the email to generate image data that represents a rendering of the email;

determining, using the image data and a second machine learning model, a second representation of the email that represents at least the rendering of the email; and determining a prediction for the email based on the first representation and the second representation, wherein the prediction represents whether the email is predicted to be malicious based on the first representation and the second representation.

18. The one or more non-transitory computer-readable media of claim 17, wherein determining the prediction comprises:

providing the first representation and the second representation to a third machine learning model, wherein the third machine learning model is configured to determine the prediction based on the first representation and the second representation; and receiving the prediction from the third machine learning model.

19. The one or more non-transitory computer-readable media of claim 17, further comprising:

based at least in part on determining that the prediction indicates that the email is malicious, determining a remedial action for the email; and processing the email based on the remedial action.

20. The one or more non-transitory computer-readable media of claim 17, wherein the first machine learning model comprises an attention-based text encoder layer.

* * * * *